(12) United States Patent
Guerin et al.

(10) Patent No.: US 8,935,025 B2
(45) Date of Patent: Jan. 13, 2015

(54) HYBRID BATTERY POWER LIMIT CONTROL

(75) Inventors: John T. Guerin, Bloomfield, MI (US); Kris S. Sevel, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 13/495,198

(22) Filed: Jun. 13, 2012

(65) Prior Publication Data
US 2013/0338862 A1    Dec. 19, 2013

(51) Int. Cl.
*B60W 20/00* (2006.01)
*H01M 10/44* (2006.01)
*H01M 10/48* (2006.01)
*B60L 11/18* (2006.01)

(52) U.S. Cl.
CPC ............ *H01M 10/443* (2013.01); *H01M 10/48* (2013.01); *B60L 2240/545* (2013.01); *B60L 11/1814* (2013.01)
USPC ........................................................ 701/22

(58) Field of Classification Search
CPC ..... B60L 11/16; B60L 11/18; B60L 11/1801; B60L 11/1807; B60L 11/1803; B60L 11/1805; B60L 11/1809; B60L 11/1811; B60L 11/1812; B60L 11/1814; B60L 11/187; B60L 11/1872; B60L 2240/42; B60L 2240/425; B60L 2240/427; B60L 2240/52; B60L 2240/525; B60L 2240/526; B60L 2240/527; B60L 2240/54; B60L 2240/545; B60L 2240/547; B60L 2240/549; B60L 3/003; B60L 3/0046; H01M 10/443; H01M 10/50; H01M 10/501; H01M 10/5016; H01M 2220/20; H01M 6/50; H02J 7/00; H02J 7/0003; H02J 7/0008; H02J 7/0021; H02J 7/0026; H02J 7/0091; Y02E 60/12; Y02T 10/7005; Y02T 10/7241
USPC .......................................................... 701/22
See application file for complete search history.

(56) References Cited

U.S. PATENT DOCUMENTS 3,808,487 A    4/1974 Feuillade
5,896,023 A    4/1999 Richter

*Primary Examiner* — Jerrah Edwards
(74) *Attorney, Agent, or Firm* — Quinn Law Group, PLLC

(57) ABSTRACT

A method of providing an electrical charge to a vehicle traction battery using a power inverter module includes sensing a temperature of the power inverter module and sensing a temperature of the traction battery. From the sensed temperatures, an engine control unit may determine an expected voltage oscillation amplitude of the electrical charge. This amplitude may be used to calculate a maximum allowable nominal voltage of the electrical charge by subtracting the expected voltage oscillation amplitude from a maximum allowable voltage of the traction battery. The maximum allowable nominal voltage of the electrical charge may then be used to limit the available power provided to the traction battery by the power inverter module.

9 Claims, 3 Drawing Sheets

HYBRID BATTERY POWER LIMIT CONTROL

TECHNICAL FIELD

The present invention relates generally to systems for managing the power limit of a hybrid battery.

BACKGROUND

Batteries may sustain internal damage and/or reduced performance if charged at a rate or voltage above a predefined upper limit. In many cases, over-voltage conditions may produce gaseous by-products and/or induce changes to the internal chemistry of the battery. Additionally, batteries generally have an internal resistance that varies inversely with temperature. When charged with a constant current, the voltage drop across the battery may vary proportionately with the temperature-dependant resistance. Therefore, at lower temperatures, a lower charging current must be supplied to ensure that the increased voltage drop does not exceed the battery's upper limit, as compared with a higher charging temperature.

In a hybrid vehicle context, a vehicle's traction battery may be charged using a power inverter module that operates using high speed switching transistors that may induce a voltage oscillation into the electrical charge. This voltage oscillation may be attenuated using capacitive filters, however, an increased amount of filtering comes at the expense of packaging space (i.e. more filtering requires larger capacitors that may be difficult to package within a vehicle engine compartment).

SUMMARY

A method of providing an electrical charge to a vehicle traction battery using a power inverter module includes sensing a temperature of the power inverter module and sensing a temperature of the traction battery. From the sensed temperatures, an engine control unit may determine an expected voltage oscillation amplitude of the electrical charge. This amplitude may be used to calculate a maximum allowable nominal voltage of the electrical charge by subtracting the expected voltage oscillation amplitude from a maximum allowable voltage of the traction battery. Once the maximum allowable nominal voltage of the electrical charge is determined, the engine control unit may command the power inverter module to provide the electrical charge to the traction battery at the maximum allowable nominal voltage.

The step of determining an expected voltage oscillation amplitude may include selecting a first calibration value from a first look-up table using the sensed temperature of the power inverter module, and selecting a second calibration value from a second look-up table using the sensed temperature of the traction battery. The first calibration value may correspond to a temperature-dependent capacitance of a filtering capacitor of the power inverter module, and the second calibration value may similarly correspond to a temperature-dependent resistance of the traction battery. In one configuration, the first calibration value, the second calibration value, and a nominal voltage oscillation amplitude may be multiplied together to determine an adjusted voltage oscillation amplitude.

In one embodiment, the method may be embodied in a hybrid vehicle that includes a traction battery having an upper voltage limit that is indicative of the maximum allowable voltage the traction battery may receive without sustaining damage. Likewise, the hybrid electric vehicle may include a power inverter module configured to provide the traction battery with an electric charge. The power inverter module may further include a filtering capacitor configured to smooth the output signal of the inverter module. An engine control unit may be in communication with the traction battery and the power inverter module.

In another configuration, the engine control unit may be configured to merely restrict the power inverter module from providing an electrical charge to the traction battery in excess of the maximum allowable nominal voltage. In this manner, the maximum allowable nominal voltage may serve as an upper charging limit to prevent damage to the traction battery.

DETAILED DESCRIPTION

Figure 1:
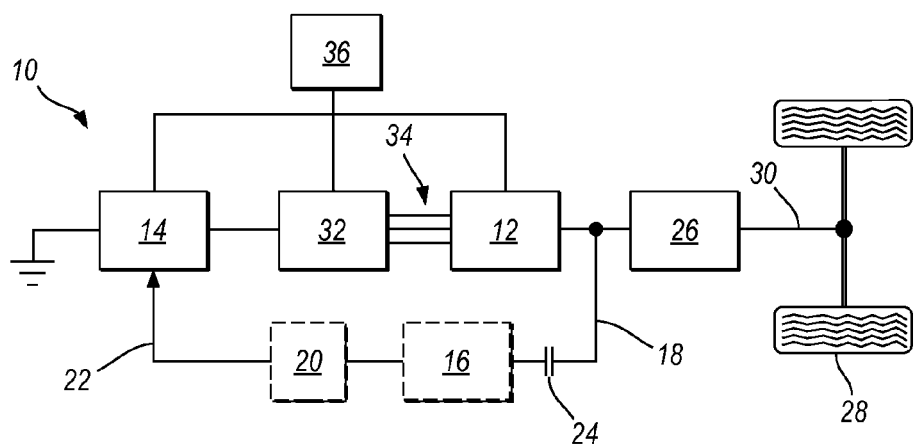
FIG. 1 is a schematic diagram of a vehicle including a traction battery, a power inverter module, and an engine control unit.

Referring to the drawings, wherein like reference numerals are used to identify like or identical components in the various views, FIG. 1 schematically illustrates a vehicle 10, such as an automobile, that includes a traction motor 12 and an energy storage system, such as a traction battery 14. While only one fraction motor 12 is shown for simplicity, multiple traction motors may be used depending on the design. The vehicle 10 may be configured as a hybrid electric vehicle (HEV), a battery electric vehicle (BEV), or an extended-range electric vehicle (EREV). Such vehicles can generate torque using the traction motor 12 at levels suitable for propelling the vehicle in an electric-only (EV) mode. As may be appreciated, the fraction battery 14 (or simply "battery 14") may include one or more battery cells of any suitable construction and/or composition. The battery 14 may be capable of discharging high voltage electrical energy as a motive power source for the vehicle 10, and storing high voltage electrical energy provided from an outside source.

In some designs, an internal combustion engine 16, shown in phantom in FIG. 1, may be used to generate torque via an engine output shaft 18. Torque from the engine output shaft 18 can be used to either directly propel the vehicle 10, i.e., in an HEV design, or to power a generator 20, i.e., in an EREV design. The generator 20 can deliver electricity (arrow 22) to the battery 14 to recharge the battery 14. A clutch and/or damping assembly 24 may be used to selectively connect/disconnect the engine 16 from a transmission 26. Torque is ultimately transmitted from the traction motor 12 and/or the engine 16 to a set of drive wheels 28 via an output member 30 of the transmission 26.

The traction motor 12 may be embodied as a multi-phase permanent magnet/AC induction machine rated for approximately 60 volts to approximately 300 volts or more depending on the vehicle design. The traction motor 12 is electrically connected to the battery 14 via a power inverter module (PIM)

32 and a high-voltage bus bar 34. The PIM 32 is configured to convert high voltage DC power into three phase AC power and vice versa as needed. The battery 14 may be selectively recharged via the traction motor 12 when the traction motor is actively operating as generator 20, e.g., by capturing energy during a regenerative braking event.

An engine control unit (ECU) 36 may be in electrical communication with each of the battery 14, PIM 32, and traction motor 12 and may be configured to monitor and control their respective performance. The ECU 36 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The ECU 36 may be configured to automatically perform one or more control/processing routines that may be embodied as software or firmware, and may either be stored locally on the ECU 36, or may be stored in a device that is readily accessible by the ECU 36.

Figure 2:
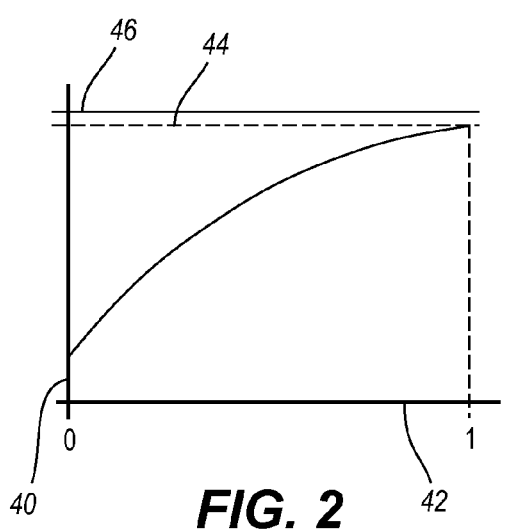
FIG. 2 is a schematic graph of battery voltage as a function of battery State of Charge.

During regeneration of the battery 14, the ECU 36 may control the behavior of the PIM 32 and traction motor 12 to supply electrical energy to the battery 14 at a predetermined rate and to a predetermined level. FIG. 2 generally illustrates the relationship between the voltage (40) of the battery 14 and the determined state-of-charge (SOC) 42 of the battery 14. As understood in the art, SOC is generally a number between 0 and 1 (also can be expressed as a percentage) that may approximately represent the amount of motive power remaining in the battery 14 relative to its maximum capacity. During regeneration, the ECU 36 may control the regeneration target voltage ($V_{Target}$) 44, such that the actual voltage provided to the battery 14 does not exceed a maximum allowable upper voltage limit ($V_{Max}$) 46, above which may reduce the usable life of the battery 14 (i.e., the battery 14 may sustain damage).

Figure 3:
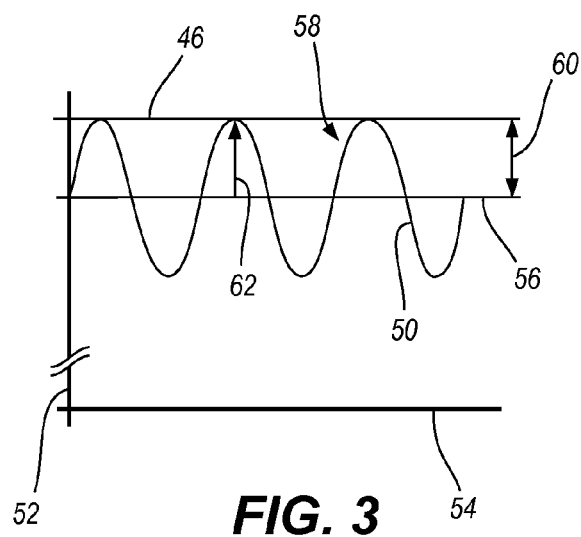
FIG. 3 is a schematic graph of an electric charge that may be provided by a power inverter module.

As may be appreciated, the PIM 32 may include a plurality of high-power transistors that may rapidly switch between "on" and "off" states to convert electricity between 3-phase AC and high voltage DC forms. Capacitors are typically included within the PIM 32 to filter out the high frequency switching spikes. Despite this filtering, however, the electric charge 50 provided to the battery 14 may still have periodic oscillations (i.e., voltage ripple), as generally illustrated in FIG. 3, where voltage 52 is plotted against time 54. As shown, the electric charge 50 may average out to a nominal voltage 56, though roughly 50% of the time, the wave (e.g., generally at 58) may exceed the nominal voltage 56. In this manner, if the ECU 36 were to drive the nominal voltage 56 to the upper voltage limit ($V_{Max}$) 46, a portion of the wave 58 would exceed $V_{Max}$ 46, even if only for a brief duration.

While increased capacitance may further reduce the amplitude of the voltage ripple/oscillations, larger capacitors require more packaging space, which may not be available. Therefore, in one configuration, the maximum nominal voltage may be statically set below $V_{Max}$ 46 by an amount 60 greater than the peak amplitude 62 of the wave at the most extreme operating conditions. In this manner, the entirety of the wave may likely fall below the maximum allowable voltage ($V_{Max}$) 46.

Figure 4:
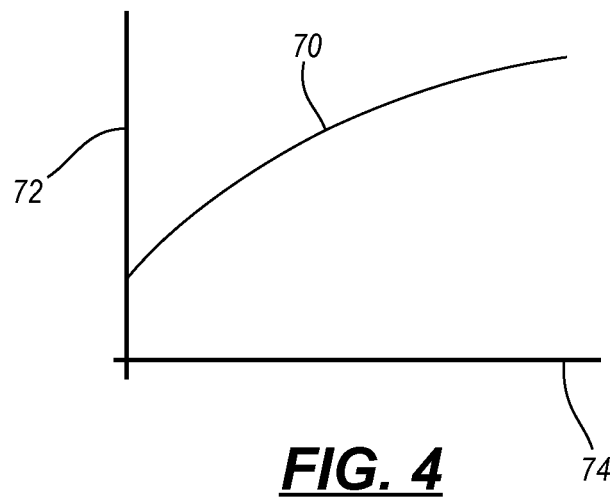
FIG. 4 is a schematic graph of the capacitance of a capacitor as a function of temperature.
Figure 5:
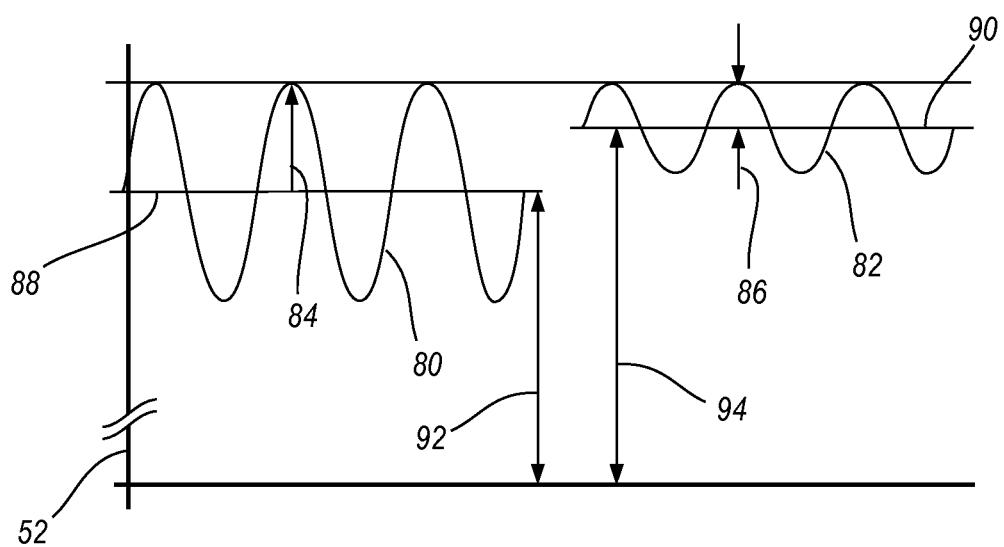
FIG. 5 is a schematic graph of an electric charge that may be provided by a power inverter module at two different temperatures.

While statically setting the max nominal voltage below the max allowable voltage 46 may ensure that $V_{Max}$ 46 is not exceeded, it may also compromise battery capacity in less extreme conditions. More specifically, as shown by the curve 70 in FIG. 4, capacitance 72 may increase as a function of temperature 74. As such, during cold temperature operation, such as cold-start, or in extremely cold environmental conditions, the electric charge 50 provided by the PIM 32 may oscillate with a greater amplitude than during warm operation where capacitance is increased. Therefore, in another configuration, such as generally illustrated in FIG. 5, the ECU 36 may be configured to vary the max nominal voltage as an increasing function of temperature 74. Said another way, the ECU 36 may dynamically adjust the offset between the max nominal voltage 56 and the upper limit voltage 46 of the traction battery 14.

FIG. 5 generally illustrates an electrical charge output 80 of cold PIM 32 (i.e., cold output 80), and the electrical charge output 82 of a warm PIM 32 (i.e., warm output 82), as a function of time 84. As shown, the oscillation amplitude 86 of the cold output 80, is larger than the oscillation amplitude 86 of the warm output 82 due to the decreased capacitance at lower temperatures. As used herein, "warm" is intended to refer to typical operating temperatures of the vehicle and can exceed 100 degrees Celsius. Conversely, "cold" is intended to refer to temperatures less than these typical operating temperatures, and may approach or be equal to the ambient air temperature of roughly 0-30 degrees Celsius.

In addition to the change in capacitance as a function of temperature, the internal resistance of the battery 14 may also change as a function of temperature (i.e., where a lower temperature may result in greater resistance, and higher temperature may result in a lower resistance). Therefore, the voltage oscillations that the battery 14 experiences may be further amplified due to the increased resistance of the battery 14 as the temperature cools. Said another way, the PIM 32 outputs a relatively constant current having oscillations that are dependent on the capacitive-filtering effects of the PIM 32. As the resistance of the battery 14 increases due to thermal effects, the voltage across the battery 14 may increase proportionally according to V=IR. Therefore, the change in battery resistance may amplify the already present oscillations In one configuration, the ECU 36 may be configured to dynamically adjust the output of the PIM 32 to account for the thermodynamic changes in capacitance and battery resistance. In this manner, the electrical charge output level 80, 82 may be commanded at a respective maximum nominal voltage 88, 90 that ensures each output 80, 82 is entirely below $V_{Max}$ 46, while also maximizing the available capacity 92, 94 of the battery 14. In another configuration, the ECU 36 may restrict the PIM 32 from providing an electrical charge output that exceeds the maximum nominal voltage 88, 90.

Figure 6:
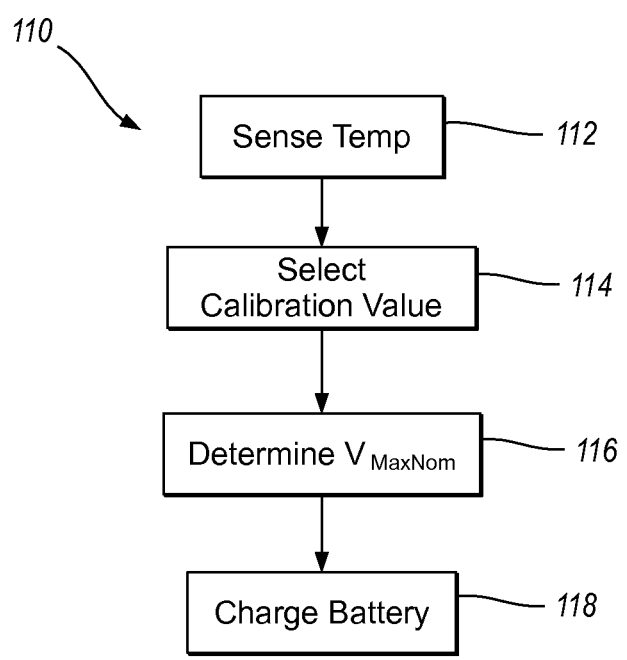
FIG. 6 is a schematic flow diagram of a method of charging a traction battery subject to a determined power limit.

FIG. 6 generally illustrates a method 110 of charging a fraction battery 14 that may be performed by an ECU 36. The method 110 begins at step 112 with the ECU 36 sensing the temperature of both the battery 14 and PIM 32. In one configuration, the ECU 36 may include a thermocouple or other temperature sensing device in thermal communication with the battery 14 and/or PIM 32 to directly sense the temperature. In another configuration, the temperature may be inferred from other temperature sensing means coupled with the vehicle 10 and/or associated vehicle coolant systems.

Once the temperature of the battery 14 and/or PIM 32 are sensed, the ECU 36 may select an oscillation calibration value from a look-up table in step 114. This calibration value may be selected using the sensed temperature values and may correspond to the amplitude of the voltage ripple that the battery 14 is likely to experience. This calibration value may either be expressed as an absolute amplitude, or as a multiple of some nominal amplitude (i.e., amplitude at predefined operating conditions).

In another configuration, in step 114, the ECU 36 may select a first calibration value corresponding to the temperature-dependant oscillation amplitude that is attributable to the capacitors at the sensed capacitor temperature. Likewise, it may also select a second calibration value corresponding to the temperature-dependant voltage ripple attributable to the battery 14 at the sensed battery temperature. The first and second calibration values may then be combined, such as by multiplying them together, to determine the amplitude of the voltage ripple that the battery 14 is likely to experience.

In step 116 the ECU 36 may determine the maximum nominal voltage (i.e., $V_{MaxNom}$) that ensures that the provided, oscillating voltage waveform does not exceed the maximum allowable voltage of the battery 14 (i.e., $V_{Max}$). In one configuration, the maximum nominal voltage may be determined by subtracting the determined amplitude of the voltage ripple from the maximum allowable voltage.

Once determined, the ECU 36 may direct the PIM 32 to charge the battery 14 at, or up to the determined maximum nominal voltage ($V_{MaxNom}$) (i.e., step 118). For example, the ECU 36 may direct the PIM 32 to supply the battery 14 with power according to the following function, where OCV represents the Open-Circuit Voltage of the battery 14, and $R_{Charge}$ represents the temperature-dependant charging resistance of the battery 14:

$$\text{Charge Power} = \frac{V_{MaxNom} * (OCV - V_{MaxNom})}{R_{charge}}$$

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of providing an electrical charge to a vehicle traction battery using a power inverter module, the method comprising:
   sensing a temperature of the traction battery;
   sensing a temperature of the power inverter module;
   determining an expected voltage oscillation amplitude of the electrical charge from the sensed temperature of the power inverter module and the sensed temperature of the traction battery;
   calculating a maximum allowable nominal voltage of the electrical charge by subtracting the expected voltage oscillation amplitude of the electrical charge from a maximum allowable voltage of the traction battery; and
   providing the electrical charge to the traction battery at the maximum allowable nominal voltage.

2. The method of claim 1, wherein determining an expected voltage oscillation amplitude includes selecting a first calibration value from a first look-up table using the sensed temperature of the power inverter module, and selecting a second calibration value from a second look-up table using the sensed temperature of the traction battery; and
   wherein the first calibration value corresponds to a temperature-dependent capacitance of a filtering capacitor of the power inverter module; and
   wherein the second calibration value corresponds to a temperature-dependent resistance of the traction battery.

3. The method of claim 2, wherein determining an expected voltage oscillation amplitude further includes multiplying the first calibration value, the second calibration value, and a nominal voltage oscillation amplitude.

4. The method of claim 1, wherein the maximum nominal voltage is an average voltage of the electrical charge supplied by the power inverter module to the traction battery; and
   wherein the electrical charge includes a voltage oscillation attributable to the switching of one or more transistors within the power inverter module.

5. A hybrid electric vehicle comprising:
   a traction battery having an upper voltage limit indicative of the maximum allowable voltage the traction battery may receive without sustaining damage;
   a power inverter module configured to provide the traction battery with an electric charge, the power inverter module including a filtering capacitor;
   an engine control unit in communication with the traction battery and the power inverter module, the engine control unit configured to:
      sense a temperature of the traction battery;
      sense a temperature of the power inverter module;
      determine an expected voltage oscillation amplitude of the electrical charge from the sensed temperature of the power inverter module and the sensed temperature of the traction battery;
      calculate a maximum allowable nominal voltage of the electrical charge by subtracting the expected voltage oscillation amplitude of the electrical charge from the upper voltage limit of the traction battery; and
      restrict the power inverter module from providing an electrical charge to the traction battery in excess of the maximum allowable nominal voltage.

6. The vehicle of claim 5, wherein the engine control unit is configured to determine an expected voltage oscillation amplitude by selecting a first calibration value from a first look-up table using the sensed temperature of the power inverter module, and by selecting a second calibration value from a second look-up table using the sensed temperature of the traction battery; and
   wherein the first calibration value corresponds to a temperature-dependent capacitance of the filtering capacitor of the power inverter module; and
   wherein the second calibration value corresponds to a temperature-dependent resistance of the traction battery.

7. The vehicle of claim 6, wherein the engine control unit is configured to determine an expected voltage oscillation amplitude by further multiplying the first calibration value with the second calibration value.

8. The vehicle of claim 5, wherein the maximum nominal voltage is an average voltage of the electrical charge supplied by the power inverter module to the traction battery; and
   wherein the electrical charge includes a voltage oscillation attributable to the electrical switching of the power inverter module.

9. A method of limiting the maximum electrical voltage provided to a vehicle traction battery by a power inverter module, the method comprising:
   sensing a temperature of the traction battery;
   sensing a temperature of the power inverter module;
   determining an expected oscillation amplitude of electrical voltage from the sensed temperature of the power inverter module and the sensed temperature of the traction battery;
   calculating a maximum allowable nominal voltage by subtracting the expected voltage oscillation amplitude of the electrical charge from an upper voltage limit of the traction battery, the upper voltage limit being indicative of the maximum allowable voltage the traction battery may receive without sustaining damage; and restricting the power inverter module from providing an electrical voltage to the traction battery in excess of the maximum allowable nominal voltage.

\* \* \* \* \*